United States Patent [19]

Bartkus et al.

[11] 4,275,107
[45] Jun. 23, 1981

[54] POLYESTER STABILIZATION PROCESS AND PRODUCT

[75] Inventors: Edward A. Bartkus; Robert L. Price, both of Tucson, Ariz.

[73] Assignee: International Business Machines Corporation, Armonk, N.Y.

[21] Appl. No.: 150,830

[22] Filed: May 19, 1980

[51] Int. Cl.³ .................. B29D 7/22; B29C 25/00
[52] U.S. Cl. ..................... 428/220; 264/342 RE; 264/346; 428/480; 428/910; 528/309
[58] Field of Search ............ 264/342 R, 342 RE, 346, 264/235.6, 235.8, 230; 428/220, 480, 910; 528/309

[56] References Cited

U.S. PATENT DOCUMENTS

| 3,595,836 | 7/1971 | Korneli et al. | 264/346 |
| 3,632,726 | 1/1972 | Knox et al. | 264/230 |
| 3,663,683 | 5/1972 | Czerkas et al. | 264/346 |
| 3,683,060 | 8/1972 | Tanabe et al. | 264/346 |
| 3,980,748 | 9/1976 | Okuyama | 264/346 |
| 4,160,799 | 7/1979 | Lacey et al. | 264/342 R |

Primary Examiner—James B. Lowe
Attorney, Agent, or Firm—Pollock, Vande Sande & Priddy

[57] ABSTRACT

A method for minimizing low temperature shrinkage of an axially-oriented polyester which includes heating the polyester out of contact with any surface by employing impinging heated gas at a temperature of about 140° to about 180° C. for a time between about 15 and about 3 seconds, and stabilized polyester obtained thereby.

11 Claims, 4 Drawing Figures

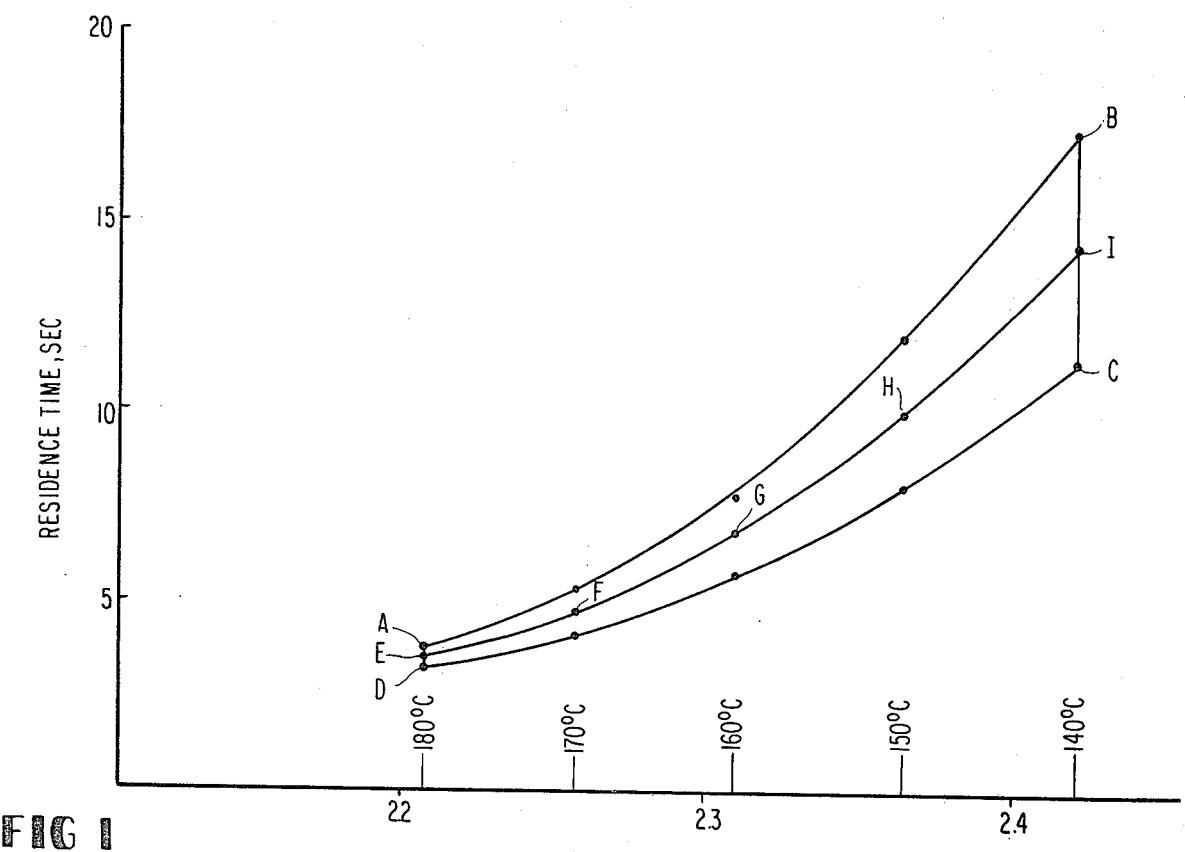
FIG 1
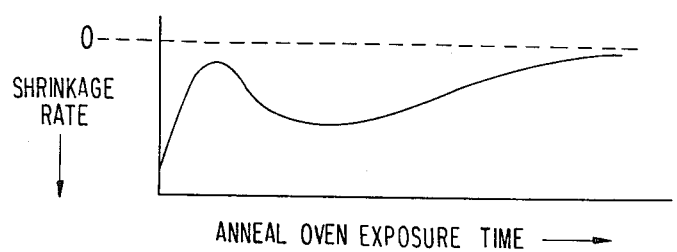
FIG 2
FIG 4
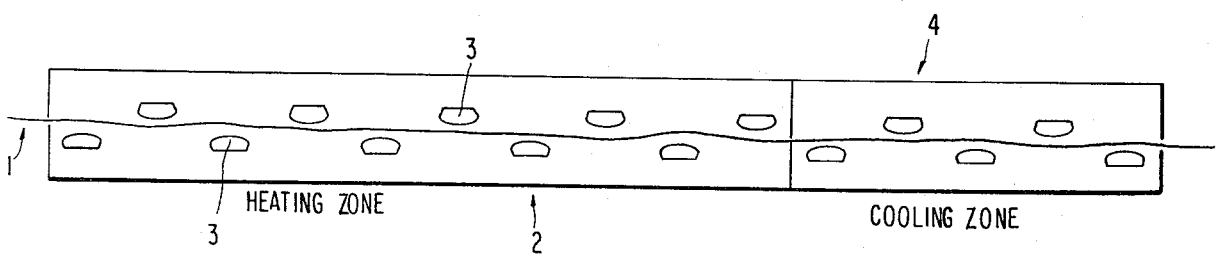

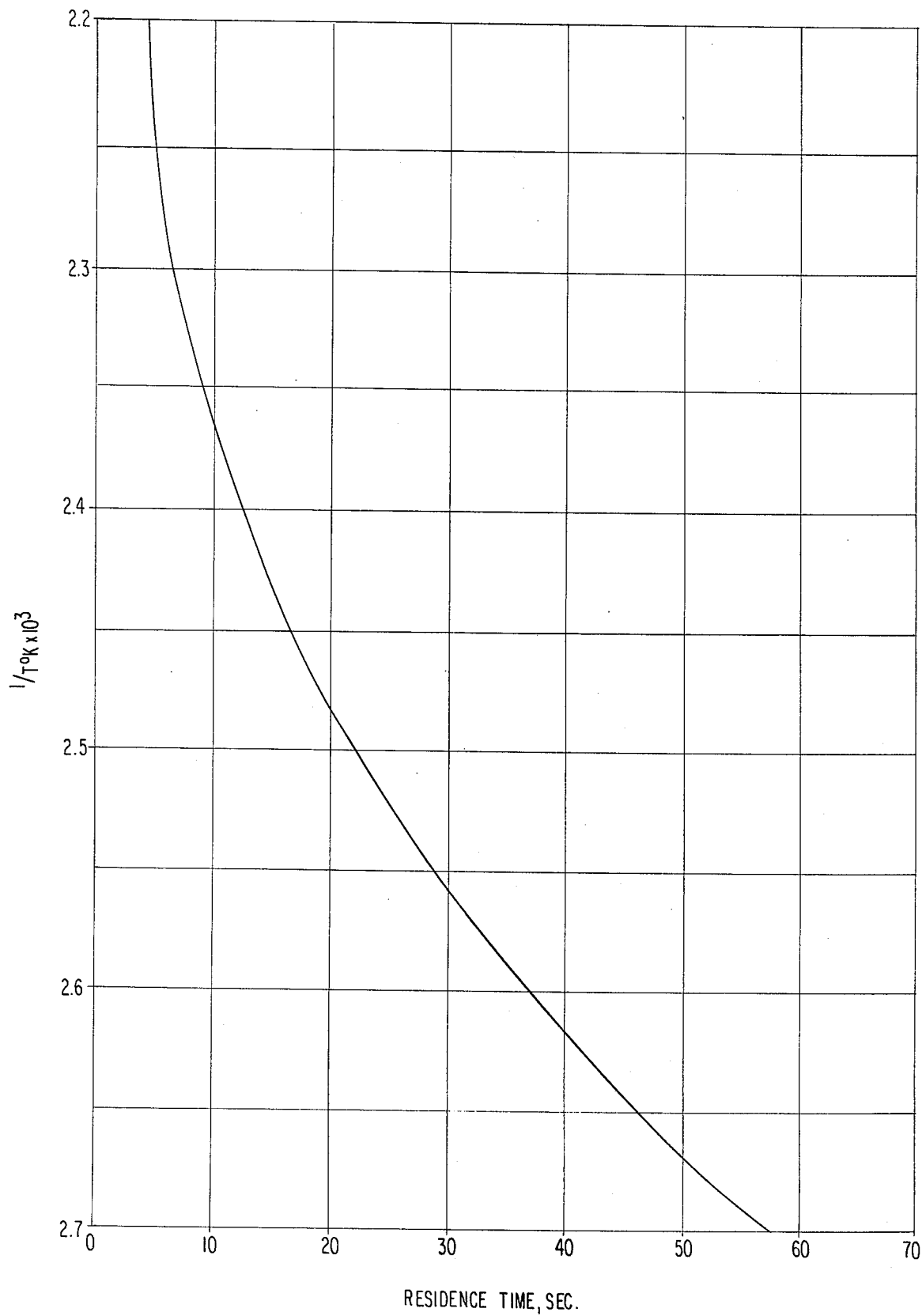

4,275,107

POLYESTER STABILIZATION PROCESS AND PRODUCT

DESCRIPTION

1. Technical Field

The present invention is concerned with heat treating an axially-oriented polyester whereby the low temperature shrinkage of the polyester is negligible. The present invention is particularly advantageous for preparing polyester films to be employed as substrates for magnetic recording media. The present invention is concerned with a heat treatment process whereby the polyester during the heat treatment is supported by impingement with a gas, rather than contact with any solid surface, such as a roller, and the product obtained by the process.

2. Background Art

Uniaxially- and biaxially-oriented polyesters have been heat treated or annealed in order to dimensionally stabilize the films for high temperature exposure, such as used in laminating and drying of photographic films. However, the effect of such treatments on low temperature shrinkage rates (e.g. below the glass transition temperature, such as at about 65° to 70° C.) has been erratic and of limited value. This is especially significant when the polyester is to be employed as a substrate for magnetic recording media. In particular, polyester substrates undergo slow and anisotropic shrinkage at normal media storage conditions thereby causing track misregistration and limiting recording density. Most commercial heat relaxation processes involve too long an exposure time which, although reducing high temperature shrinkage, does not minimize low temperature (below Tg) shrinkage.

DISCLOSURE OF INVENTION

The present invention is concerned with a method of heat treating an axially-oriented heat set polyester in such a way as to minimize the low temperature shrinkage of the polyester. The process of the present invention includes heating the polyester to a temperature of about 140° to about 180° C. for between about 15 seconds and about 3 seconds.

The time and temperature are inversely related and are selected within the above ranges to minimize the low temperature shrinkage. The area in FIG. 1 delineated by points A, B, C and D represents time-temperature relationships which provide minimal low temperature shrinkage. The selection of exposure time and temperature is critical to minimizing shrinkage and for long-term storage.

In addition, the heat treatment is carried out when the polyester is under minimal tension less than 350 psi stress. Moreover, during the heat treatment the polyester is supported by impinging heated gas and is kept out of contact with a solid surface.

In addition, as manufactured, various polyester films show anisotropic shrinkage. In other words, along a first axis the polyester shrinks to its maximum value (referred to as the maximum shrinkage rate), and shrinks to its minimum value (referred to as the minimum shrinkage rate) along an axis about 90° from the first axis. The heat relaxation, according to the present invention, to minimize shrinkage rate also results in reduction of this anisotropy. On the other hand, use of time-temperature relationships outside of the scope of the present invention can actually increase this anisotropy.

In addition, different lots of the same polyester, such as different lots of polyethylene terephthalate films, exhibit differing as received shrinkage rates and anisotropies. Treatment of the polyester, according to the present invention, to minimize shrinkage rate also yields films having very similar long-term shrinkage properties. Accordingly, heat relaxation treatment of incoming polyester provides substrates which are not only very stable to long-term storage dimension changes with little anisotropy, but are very uniform from lot to lot.

It is further noted, that the heat relaxation process of the present invention can be introduced in line with media coating for production economy and for minimizing film damage from handling as can occur in a separate process stage. The length of the relaxation oven zone can be such as to match coating line speeds.

The present invention is also concerned with the polyester obtained by the above defined process.

BRIEF DESCRIPTION OF DRAWINGS

FIG. 1 illustrates temperature and time relationship suitable for practicing the present invention.

FIG. 2 illustrates the low temperature shrinkage rate vs. the residence time at elevated temperature.

FIG. 3 illustrates shrinkage rate vs. oven residence time at various temperatures.

FIG. 4 is a schematic diagram of an oven suitable for carrying out the process of the present invention.

BEST AND VARIOUS MODES FOR CARRYING OUT INVENTION

The present invention is concerned with a method for heat treating axially-oriented heat set polyesters. The polyesters treated according to the present invention are preferably films generally having thicknesses of about ¼ to about 14 mil, and preferably about ¾ to about 5 mil. Polyester films treated according to the present invention find particular applicability as substrates for magnetic recording media. The preferred polyesters are polyethylene terephthalate such as those under the trade designation Mylar.

The process of the present invention is a heat relaxation or annealing process to stabilize oriented polyesters and to thereby minimize low temperature shrinkage. Low temperature shrinkage refers to temperatures below the glass transition temperature (i.e. Tg) of the polyester, such as temperatures below about 65° to about 70° C.

In order to achieve the desired results according to the present invention, it is essential that the time and temperature relationship as illustrated in FIG. 1 be observed. In particular, the temperature employed must be about 140° to about 180° C. and the times of treatment range from about 3 to about 15 seconds depending on the temperature employed.

As illustrated in FIG. 1, the time and temperature are inversely related. That is, an increase in the temperature requires a decrease in the time of treatment; and conversely, a decrease in the temperature requires an increase in the treatment time to achieve the results obtained by the present invention. The best results have been achieved at 180° C. for about 3.5 seconds ±0.25 second, at 160° C. for about 6.8 seconds ±1 second, at about 140° C. for about 14.5 seconds ±3 seconds; at 150° C. for about 10 seconds ±2 seconds; and at 170° C. for about 4.75 seconds ±0.6 second.

In addition, it is noted that temperatures above 180° C. begin producing out-of-plane distortions of the final film and, therefore, make is unusable as a magnetic media substrate. Furthermore, as illustrated in FIG. 3, temperatures below about 140° C., such as 130° C. and 120° C., are not satisfactory, since the maximum reduction in the shrinkage rate at these lower temperatures is inferior to that achieved by the present invention. Moreover, the times required for achieving the maximum reductions at temperatures of 130° C. and 120° C. were substantially higher than those for the temperatures within the scope of the present invention.

In addition, it is essential to the practice of the present invention that the polyester during the heat relaxation step be subjected to only minimal tension, and preferably that which yields less than about 350 psi stress, and most preferably less than about 250 psi stress. Preferably no transverse pressure is applied to the polyester during the heat treatment. The temperature treatment of the present invention is distinct from heat setting processes, since the polyester employed is already heat set and since heat setting processes employ much greater tension during the heat treatment.

Moreover, the process of the present invention is carried out by supporting or suspending the polyester during the heat treatment in a fluid, preferably air, so as to keep the polyester out of contact with any solid surface. One convenient means to heat and suspend the film is by use of a TEC dryer obtained from TEC Systems, Inc. which is schematically shown in FIG. 4. In particular, FIG. 4 illustrates the film 1 proceeding through the heat relaxation oven shown in cross-section whereby perforated bars 3 spaced about 6" apart and alternating above and below the film 1 are provided to supply the fluid, preferably heated air to heat and support the polyester as it travels through the oven. Also, as illustrated in FIG. 4, the oven has a cooling zone 4 whereby cooled air can be contacted with the film so that it is at a temperature of about 70° C. when leaving the heat relaxation oven. Preferably, the film 1 should not contact any solid surface such as any idler rolls before the film cools to less than about 70° C.

In one particular aspect, a 30 foot relaxation oven zone has been employed which can match coating line speeds employed for the polyester film in preparing recording media and is fed at speeds of about 540 feet per minute at 180° C. Of course, other oven lengths can be employed to match other coating line speeds. This feature of the present invention is quite suitable for a commercial operation in that the relaxation process can be in line with media coating for production economy.

The film as it passes through the heat treatment stage is preferably substantially planar with minimal wave distortion.

The criticality of the time-temperature relationship which must be observed in order to minimize low temperature shrinkage according to the present invention is illustrated by FIG. 2 which illustrates the shrinkage rate vs. anneal oven residence time. As shown, the low temperature shrinkage rate reaches a minimum at relatively short times and then increases with increasing exposure time to a relative maximum before asymptoting to 0 rate for very long exposure times.

Biaxially-oriented polyethylene terephthalate film of about 1.42 mils and avialable from Du Pont under the trade designation Mylar 142PB is heat treated in an oven of the type schematically illustrated in FIG. 4 at the temperatures and times reported hereinafter. The tension of the films is about 100 psi. The films as received prior to the heat treatments have a maximum shrinkage rate ($B_{max}$) of about −0.023%/time decade in hours and a minimum shrinkage rate ($B_{min}$) of about −0.006%/time decade in hours. The shrinkage rates are determined by monitoring length of a strip of the film, cut such that the long axis of the film test specimen is parallel to the desired film test direction, while maintaining the test specimen at 55±1° C. and <10% relative humidity. The percentage change in specimen length, i.e., $$\Delta L, \% = \frac{L_{time=0} - L_{time=t}}{L_{time=0}} \times 100$$

when plotted versus the logarithm (base 10) of test time in hours, yields a straight line relationship:

$$\Delta L, \% = B \times \log t$$

The slope of this line, B, is shrinkage rate in percent per time decade in hours. The minimum and maximum shrinkage rates are about 90° apart. The results obtained are reproduced below.

HEAT RELAXATION TEMPERATURE: 140° C.

(1) Residence time: 10 sec.

$B_{max} = -0.014\%$ $B_{min} = -0.003\%$ (2) Residence time: 15 sec.

$B_{max} = -0.004\%$ $B_{min} = -0-$ (3) Residence time: 30 sec.

$B_{max} = -0.010\%$ $B_{min} = -0.002\%$

HEAT RELAXATION TEMPERATURE: 150° C.

(1) Residence time: 5 sec.

$B_{max} = -0.016\%$ $B_{min} = -0.003\%$ (2) Residence time: 12 sec.

$B_{max} = -0.005\%$ $B_{min} = -0.002\%$

As noted from the above results, at 140° C. the times of 10 sec. and 30 sec. are not suitable for achieving the results obtained by practicing the time-temperature relationships of the present invention. Also, at 150° C., 5 sec. was too short for achieving the results obtained by practicing the present invention.

What is claimed is:

1. A method of heat treating an axially-oriented heat-set polyester whereby low temperature shrinkage is negligible which comprises heating said polyester to a temperature of about 140° to about 180° C. for a time between about 15 seconds and about 3 seconds, as defined by the area in FIG. 1 delineated by points A, B, C and D, under tension of less than about 350 psi in its longitudinal dimension and impinging heated gas on the film so as to heat said film to the above temperature and to buoy the film and keep it out of contact with any solid surface during the heat treatment at about 140° to 180° C.

2. The method of claim 1 wherein said polyester is a biaxially-oriented heat set polyester film.

3. The method of claim 2 wherein said film has a thicnkess of about ¼ to about 14 mil.

4. The method of claim 2 wherein said film has a thickness of about ¾ to 5 mil.

5. The method of claim 1 wherein the time-temperature relationship is defined by the line delineated by points E, F, G and H in FIG. 1.

6. The method of claim 1 wherein the tension during the heat treating is less than about 250 psi.

7. The method of claim 1 wherein the polyester does not contact any solid surface before the temperature of the polyester has cooled down to less than about 70° C.

8. The method of claim 1 wherein said polyester is polyethylene terephthalate.

9. The method of claim 1 wherein the polyester is substantially planar during the heat treating.

10. An axially-oriented heat set polyester of negligible low temperature shrinkage obtained by the process of claim 1.

11. The polyester of claim 10 which is biaxially-oriented polyethylene terephthalate film of ¼ to about 14 mil thickness.

* * * * *